3,171,855
SEPARATING ISOMERIC MENTHYL OXALATE ESTERS BY AGITATING A CRYSTALLIZING MIXTURE OF SAID ESTERS
Robert L. Webb and Mickey L. Payne, Jacksonville, Fla., assignors to The Glidden Company, Cleveland, Ohio, a corporation of Ohio
No Drawing. Filed Feb. 12, 1962, Ser. No. 172,748
5 Claims. (Cl. 260—485)

The present invention relates to the crystallization of menthol esters, and particularly relates to a procedure for obtaining high purity l-menthol esters from a mixture of l- and dl-menthyl esters.

Unless otherwise indicated the terms dl-ester; dl-menthyl ester; and dl-crystals as used herein include both the meso- or internally compensated esters as well as the racemic or externally compensated form.

It is possible to separate a mixture of l- and dl-menthyl oxalates in small batches by fractional crystallization since under these conditions the dl-menthyl oxalate crystallizes first from a mixture of the l- and dl-esters. This enables one to first remove the dl-crystals and then to continue the crystallization for the recovery of l-menthol esters of high optical purity. This phenomenon is probably due to the fact that the dl-ester crystallizes faster than the l-ester and the remaining solvent is able to hold the l-ester in a supercooled condition.

Whatever the explanation it is not possible to obtain this type of preferential crystallization in large volumes since both the l- and dl-esters crystallize together. This is in accordance with the known fact that it is difficult to form supercooled solutions in large volume.

It is accordingly an object of the invention to provide a novel process for recovery of l-menthyl esters from a mixture of the l- and dl-esters.

If both the l- and dl-oxalates are precipitated simultaneously under quiescent conditions they will form a mass of crystals in which both the l- and dl-ester crystals are present. Upon gently breaking this eutectic conglomerate apart without any appreciable breaking up of the individual crystals it is found that the dl-ester crystals are finer than the l-ester crystals. Also, both the meso and racemic forms of the dl-crystals are feathery whereas the l-crystals are dense. If one then screens the resulting mixture of crystals through a screen of appropriate mesh size two fractions of different optical activity can be recovered. However, a sharp line of division cannot be obtained between the two types of crystals by this procedure since the particle size range of the two types of crystals overlap.

In accordance with a preferred form of the present invention a sharp separation of the optically active l-crystals from the optically inactive crystals is obtainable by mildly agitating the crystallizing medium during crystallization, whereby the fine, feathery crystals are kept in suspension while allowing the denser crystals to settle to the bottom of the crystallizing vessel, and continually removing the finer lighter crystals from the crystallizing zone during the continuation of the crystallization.

By this means the fine, light dl-crystals are removed from the crystallization zone without having a chance to grow substantially and at the same time the denser crystals have a chance to increase in size. Thus, in addition to making full use of both the differences in density and particle size the procedure tends to enhance the difference in particle size.

It has been found convenient in practice to continuously decant the slurry of fine crystals and mother liquor, filter the slurry and return the filtered mother liquor containing ester in solution to the crystallization zone for further crystallization. Other means for removing the dl-crystals can be used however, such as pumping the supernatant slurry through a filter, use of a rotating suction filter dipping into the agitated slurry, etc.

The rate of cooling will affect the degree of separation to some extent. If the solution to be crystallized is cooled too rapidly after crystallization commences there will not be a sufficient difference in particle size to make a complete separation possible. By a gradual lowering of the temperature after reaching the initial crystallization point practically complete separation is possible. Cooling rates of from 2° C. to 5° C. per hour have been found suitable. Slower rates can of course be employed. Faster cooling rates than 5° C. per hour can be used but at some loss in the degree of optical purity of the l-oxalate, and concurrently with an increase in the optical activity of the dl-ester.

Any suitable solvent can be used for the crystallization. Hyrocarbon solvents, such as hexane, are preferred, but polar solvents, such as isopropanol have been used.

It will be appreciated that the temperature at which crystallization of any new batch commences will depend upon the initial concentration. However, as crystallization proceeds the temperature will be reduced and crystallization continued until the concentration of ester in the mother liquor has been lowered to a point that further crystallization is no longer practical. The final mother liquor can however be used for dissolving a new batch of ester unless it has become too contaminated by the accumulation of impurities present in the esters. The cooling curve during crystallization need not be continuous but can be stepwise, it being understood that large rapid decreases in temperature may result in some decrease in the degree of separation.

It is not necessary however that the dl-crystals be removed during the course of the crystallization. The crystallization can be continued until the desired end point is reached and the supernatant slurry then removed and the settled dense l-crystals recovered. Thus, the invention in its broadest aspects contemplates conducting the crystallization while maintaining mild agitation to prevent the formation of a conglomerate crystal mass, to maintain the dl-crystals in suspension and to allow the l-crystals to settle.

It will be appreciated that mixture of d- and dl-oxalates can be treated in the same way to recover the d-menthyl oxalates.

The following examples are illustrative.

*Example 1*

To a 2500 gallon tank provided with an agitator was added 1160 gallons (6700 pounds) of hexane and 5085 pounds of a mixture of l- and dl-menthyl oxalates having an optical rotation of −82°. Since the optical rotation of pure l-menthyl oxalate is −100 to −101° this mixture was approximately 82% l-menthyl oxalate and 18% dl-menthyl oxalate. The crystals were dissolved at 45° C. and when dissolved the solution was cooled at the rate of 5° C. per hour by means of external cooling until the temperature reached 20° C. at which point crystallization began. Thereafter further cooling was continued at the rate of 2 C. per hour for twelve hours. The crystallizing mixture was mildly agitated during the course of the crystallization to maintain a slurry of fine crystals dispersed in the liquid and to allow the large dense crystals of l-oxalate to settle to the bottom of the tank. During the crystallization slurry was continuously pumped from the top of the crystallization tank at the rate of about twenty gallons per minute and passed through a filter. The filtered mother liquor was continuously returned to the top of the crystallizer.

When a temperature of −4° C. was reached further lowering of the temperature was stopped while continuing the withdrawal and filtering of the slurry until no more dl-crystals were being deposited on the filter. The pumping was then stopped and the contents of the crystallizer transferred to a centrifuge. The yield of centrifuged crystals was 3000 pounds of l-menthyl oxalate having a rotation of —99°. The yield of dl-crystals on the filter was 750 pounds having a rotation of —2 to —5°.

The mother liquor from the centrifuge was then used to dissolve an additional 3750 pounds of the menthyl-oxalates and the precedure repeated.

*Example 2*

The general procedure was essentially the same as in Example 1 except that the optical rotation of the starting mixture of oxalates was —35° and the dissolution was made at 55° C. Due to the high content of dl-esters they began to crystallize before any l-crystals were formed. The crystallization was continued to —40° C., the two crops of crystals being recovered in the same manner as in Example 1. The yield of l-menthyl oxalate was 1305 pounds having a rotation of about —99° and about 3500 pounds of dl-menthyl oxalates having a rotation of about —1°. The mother liquor contained about 5% esters of which about 85% was the l-ester.

It will be understood that the foregoing examples are only illustrative and that many variations are possible within the scope of the invention. The point at which initial crystallization begins will of course vary with the initial concentration. Also, as shown by the examples, the crystallization temperature will be higher for oxalates having higher percentages of dl-ester, other conditions being equal. The point of initial crystallization will also depend upon the particular solvent used. Also, any suitable final temperature can be employed, it being preferred to stop the crystallization at 10 to —20° C. in most cases. Lower final temperatures are preferred when treating oxalate of lower l-ester content. Within the final temperature ranges indicated the percentage of l-ester in the final mother liquor will be about 80–85% of the total ester content.

Having described the invention what is claimed is:

1. In the process of recovering optically active menthyl oxalate produced by the simultaneous crystallization from solution of a mixture of optically active menthyl oxalate crystals and dl-menthyl oxalate crystals from which under quiescent conditions the crystals precipitate to form a eutectic conglomerate of crystals of dense, optically pure menthyl oxalate crystals and relatively finer, feathery dl-menthyl oxalate crystals the improvement which consists essentially in (1) gradually cooling such a solution, in which the percent of optically active menthyl oxalate ester is from about 1% to about 99% of the total oxalate crystals, in a crystallization zone to cause crystallization of the oxalates while mildly agitating the crystallizing mixture to keep the dl-menthyl oxalates in suspension and while allowing the optically active menthyl oxalate crystals to settle, (2) removing the dl-menthyl oxalate crystals from the crystallization zone during the crystallization while allowing the settled optically active menthyl oxalate crystals to remain in the crystallization zone during crystallization, and (3) then recovering the settled optically active menthyl oxalate crystals.

2. The process of claim 1 in which the optically active menthyl oxalate is l-menthyl oxalate.

3. The process of claim 2 in which the rate of cooling is about 2–5° C. per hour.

4. The process of claim 2 in which the solvent is a hydrocarbon.

5. The process of claim 1 in which suspension of dl-menthyl oxalates in mother liquor is continuously removed from the crystallization zone during crystallization, suspended dl-oxalates are separated from the removed suspension, and the resulting mother liquor is returned to the crystallization zone for further crystallization.

References Cited in the file of this patent
UNITED STATES PATENTS

| | | |
|---|---|---|
| 2,699,456 | Kimball et al. | Jan. 11, 1955 |
| 2,767,224 | Kimball | Oct. 16, 1956 |
| 2,935,526 | Bain | May 3, 1960 |

FOREIGN PATENTS

| | | |
|---|---|---|
| 397,212 | Great Britain | Aug. 24, 1933 |

OTHER REFERENCES

Weissberger: Technique of Organic Chemistry, vol. 1, 3rd edition, Interscience Publishers, Inc., New York, 1959, page 346.